US012531882B2

(12) United States Patent
Robertson et al.

(10) Patent No.: US 12,531,882 B2
(45) Date of Patent: Jan. 20, 2026

(54) ACCURACY IN ATTACK TECHNIQUE LABELING IN AN EXTENDED DETECTION SYSTEM

(71) Applicant: Cisco Technology, Inc., San Jose, CA (US)

(72) Inventors: Matthew Scott Robertson, Morpeth (CA); Sunil Navinchandra Amin, Atlanta, GA (US); Michael Joseph McPhee, Victor, NY (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 18/657,330

(22) Filed: May 7, 2024

(65) Prior Publication Data

US 2025/0350609 A1 Nov. 13, 2025

(51) Int. Cl.
*H04L 9/40* (2022.01)
(52) U.S. Cl.
CPC .............................. *H04L 63/1416* (2013.01)
(58) Field of Classification Search
None
See application file for complete search history.

(56) References Cited

U.S. PATENT DOCUMENTS

| 11,290,483 | B1 | 3/2022 | Kannan et al. | |
| 11,343,263 | B2* | 5/2022 | Tyagi | H04L 63/20 |
| 2020/0074078 | A1 | 3/2020 | Saxe et al. | |
| 2021/0273970 | A1* | 9/2021 | Alshech | H04L 63/1433 |
| 2022/0174080 | A1 | 6/2022 | Mistry et al. | |
| 2023/0048076 | A1* | 2/2023 | Kim | G06N 20/20 |
| 2023/0113375 | A1 | 4/2023 | Thomas et al. | |
| 2023/0114821 | A1* | 4/2023 | Thomas | H04L 63/1433 726/23 |
| 2023/0224324 | A1 | 7/2023 | Karabey et al. | |
| 2023/0308462 | A1* | 9/2023 | Choi | H04L 63/1425 |

(Continued)

OTHER PUBLICATIONS

Legroy, et al., "Automated Retrieval of ATT&CK Tactics and Techniques for Cyber Threat Reports", arxiv.org, Cornell University Library, Apr. 29, 2020, pp. 1-20.

(Continued)

*Primary Examiner* — Fatoumata Traore
(74) *Attorney, Agent, or Firm* — Lee & Hayes, P.C.

(57) ABSTRACT

Techniques for providing a confidence rating for an attack technique tag and a guidance for improving the confidence rating are described. An attack technique analytics engine receives telemetry data, a notification that an attack has been detected using an attack detection source, the notification including an attack technique tag indicating an attack technique used in the attack, and attack technique data including a likelihood of a particular attack technique, from among multiple attack techniques, occurring determined using a particular attack detection source from among multiple attack detection sources. Based on the telemetry, the attack technique tag, and the attack technique data, a confidence rating that the attack corresponds to the attack technique is determined. The attack detection source and attack technique are analyzed to determine a guidance for improving the confidence rating, and the rating and guidance are appended to the attack technique tag.

20 Claims, 4 Drawing Sheets

(56) References Cited

U.S. PATENT DOCUMENTS

2023/0396638 A1* 12/2023 Hebbagodi ............. H04L 63/20
2023/0421581 A1    12/2023 dos Santos et al.

OTHER PUBLICATIONS

Nir, et al., "Labeling NIDS Rules with MITRE ATT &CK Techniques Using ChatGPT", Computer Security, ESORICS 2023 International Workshops, Mar. 12, 2024, pp. 76-91.
Search Report and Written Opinion for International Application No. PCT/US25/27968, Dated Jul. 9, 2025, 16 pages.

* cited by examiner

ACCURACY IN ATTACK TECHNIQUE LABELING IN AN EXTENDED DETECTION SYSTEM

TECHNICAL FIELD

The present disclosure relates generally to increasing the efficacy and fidelity in the labeling of an attack technique for an Extended Detection and Response System by increasing the accuracy of the tag itself based on downstream data sets and a detection model.

BACKGROUND

Detection and response security solutions are ever increasing in importance in today's cyber environment. Detection and response security solution aim to detect any potential malicious or fraudulent activity perpetrated by cyber criminals in order to stop the activity and prevent the detected activity from happening again. Typically, the detection of such malicious activity is aided by collecting and analyzing telemetry from one or more sources. When potential malicious activity is detected, a common approach is for a detection and response system to map, or include in detection data, a tag indicating a technique used by an attacker to facilitate the fraudulent activity. For example, one commonly used framework is MITRE ATT&CK and a detection engine, such as in an Endpoint Detection and Response (EDR) system to produce a detection artifact indicating an attack Tactic, Technique and Procedure (TTP) used by a malicious entity. The MITRE ATT&CK framework provides an attempt to document known attacker actions known as Tactics, Techniques, sub-Techniques and Procedures. This framework provides a common lexicon that many detection vendors use to express what their detections are identifying.

The mapping of threat detection to an attacker's technique (e.g., MITRE TTP) is subject to great variability and subjectivity both on behalf of a detection vendor, the data available in the detection and the environment in which the detection is occurring. For example, many TTPs have multiple methods of detection, some with more accuracy than others. In addition to the method of detection, the artifact itself will have an accuracy in its label based on the data available, the domain the detection tool resides in. Thus, the end result of this mapping in single detection artifacts is that an attacker technique tag (TTP tag) is only accurate to a certain percentage, and that percentage can vary greatly. Ultimately this results in little confidence in the technique an attacker is using making it difficult to properly take remedial action.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes a method, performed at least in part by an attack technique analytics engine, the method includes receiving a stream of telemetry data generated by a telemetry source. The method also includes receiving, from an attack detection analytics engine, a notification that an attack has been detected using an attack detection source, the notification including an attack technique tag indicating an attack technique being used in the attack. The method also includes, receiving, form an attack detection method scoring model attack technique data including a likelihood of a particular attack technique, from among multiple attack techniques, occurring determined using a particular attack detection source from among multiple attack detection sources. The method also includes determining, based at least in part on (i) the stream of telemetry data, (ii) the attack technique tag, and (iii) the attack technique data, a confidence rating that the attack corresponds to the attack technique. The method also includes analyzing the attack detection source and the attack technique to determine a guidance for improving the confidence rating. Finally, the method includes appending the confidence rating and the guidance for improving the confidence rating to the attack technique tag.

Example Embodiments

As described above, in today's ever increasing cyber environment it is more crucial than ever to identify and stop potentially malicious cyber activities that threaten end-users, enterprise organizations, interconnected devices, data, networks, etc. In an extended detection and response system, telemetry from multiple sources is collected, analytics are applied to the telemetry in order to detect malicious activity, and remedial action is taken to stop the malicious activity. Telemetry is collected from multiple sources, such as raw log telemetry (e.g., flow records, system logs, etc.) as well as detection telemetry (e.g., firewall, endpoint detection logs, etc.). The telemetry is normalized, and analytics performed. The resulting extended detection is potentially anchored off of a single detection from a single downstream data source and decorated with data from other downstream data sources and/or self-created by an extended detection and response analytics engine. Additionally, the extended detection includes a tag indicating a tactic, technique, or procedure employed by an attacker perpetrating the malicious activity. The extended detection and response system will then display the resulting detection to a user or administrator with the attached tactic, technique, or procedure tag. In many instances, the tag corresponds to a cell in the MITRE ATT&CK matrix, known as an attacker's tactic, technique (or sub-technique) and procedure (TTP). For example, a tag may indicate that the MITRE ATT&CK TTP is "Event Triggered Execution" (T1546). Note that although MITRE ATT&CK is used herein to describe a framework of known attack techniques, this is by example and not limitation. Typically, an extended detection and response system will state the tactic, technique, and procedure as labelled by a detection engine, which is generally a one-to-one mapping of an attack detection to an attack technique with no indication as to accuracy. The issue arising in this process is that the tactic, technique or procedure may not be correct, and there is little way of knowing how likely or unlikely that the attack technique is actually what is indicated in the technique tag. In cases where the attack technique indicated is incorrect, and remedial action taken to mitigate the indicated attack, not only will the real attack technique not be addressed, but additional harm is introduced to the system by the actions taken to address a presumed attack that in reality is not present.

This disclosure is directed to techniques for increasing the efficacy and fidelity in the labeling of an attack technique for an extended detection and response system by increasing the accuracy of the attack technique tag itself. Based on downstream data sources and detection methodologies used in the extended detection, a confidence rating can be included in the attack technique tag indicating a likelihood that the attack technique tag generated is in fact accurate. In addition, a gap analysis may be performed on the data set and included with the attack technique tag to provide guidance for improving the confidence rating that the attack technique tag is accurate. To implement techniques described herein, a second layer of analytics on top of an existing extended detection and response system analytic layer is applied. This second layer of analytics includes a technique database with known methods of detection (e.g., MITRE ATT&CK matrix, MITRE DEF3ND, etc.), an attack detection method scoring model, and an attack technique analytics engine. The attack detection method scoring model serves as a foundation for determining the likelihood of a given detection technique to detect an attack technique. As many attack techniques span domains and data sets, a single method of detection (e.g., flow analytics) will not necessarily detect all occurrences of a specific attack technique (e.g., data exfiltration) with 100% accuracy at all times. Thus, the detection method scoring model works to assign percentages and probabilities to a detection method given the data inputs and the attack technique described. The detection method scoring model may be a machine learning model trained on data sets of known attacker techniques with mitigating controls or methods of detections. The data sets may be acquired from technique database(s) (e.g., MITRE ATT&CK). The detection method scoring model may improve over time as more, and more accurate, data input is used in the algorithms.

The attack technique analytics engine leverages multiple telemetry data streams of both raw telemetry and detection telemetry from a data repository, multiple available extended detections and their resulting attack technique tags from a typical extended detection system (i.e., the output of a conventional extended detection system, or the first layer of the extended detection system described above), and the attack detection method scoring model output as described above. The attack technique analytics engine then computes a confidence rating-a probability that the attack technique tag is the actual attack technique given the sources of the data streams and detection methodologies used in the extended detection. In some examples, if the attack technique analytics engine determines that an attack technique tag received from the first layer of the extended detection system is most likely not accurate, or the accuracy is below a predetermined threshold level, the attack technique analytics engine may generate a new attack technique tag based on the attack detection method scoring model output and the given data streams available.

Additionally, a gap analysis on the data set is performed by the attack technique analytics engine. For example, if the probability that the assigned attack technique tag for the detection is 70% likely that the attack technique is accurate given the attack detection source, the gap analysis can identify what additional data sources or detection methodologies would increase the probability that the attack technique is accurate.

The attack technique analytics engine outputs the extended detection with attack technique tag. This artifact is either the original tag (or tags) received from an attack detection analytics engine of the first layer of the extended detection and response system, or a newly generated attack technique tag if the analytics performed by the attack technique analytics engine determines that a different attack technique is more likely than the attack technique provided by the attack detection analytics engine. The artifact consists of a confidence metric and a guidance for improving the confidence metric as described above. The enhanced attack technique tag is then appended to the extended detection as part of the output of the extended detection and response system.

The techniques described herein for applying a confidence rating to an attack technique and providing guidance via a gap analysis for improving the confidence rating of the attack technique, significantly enhance and improve the accuracy of an extended detection and response system that relies upon a common lexicon framework to describe the nature of an attack that is being detected. The techniques described herein provide numerous advantages to customers and vendors including the ability to measure the confidence in the technique tag itself (conventional solutions provide a one-to-one mapping of a detection to a technique with no confidence meter in the mapping available) as well as the ability to meter how a detection could be improved with additional data sources.

Figure 1:
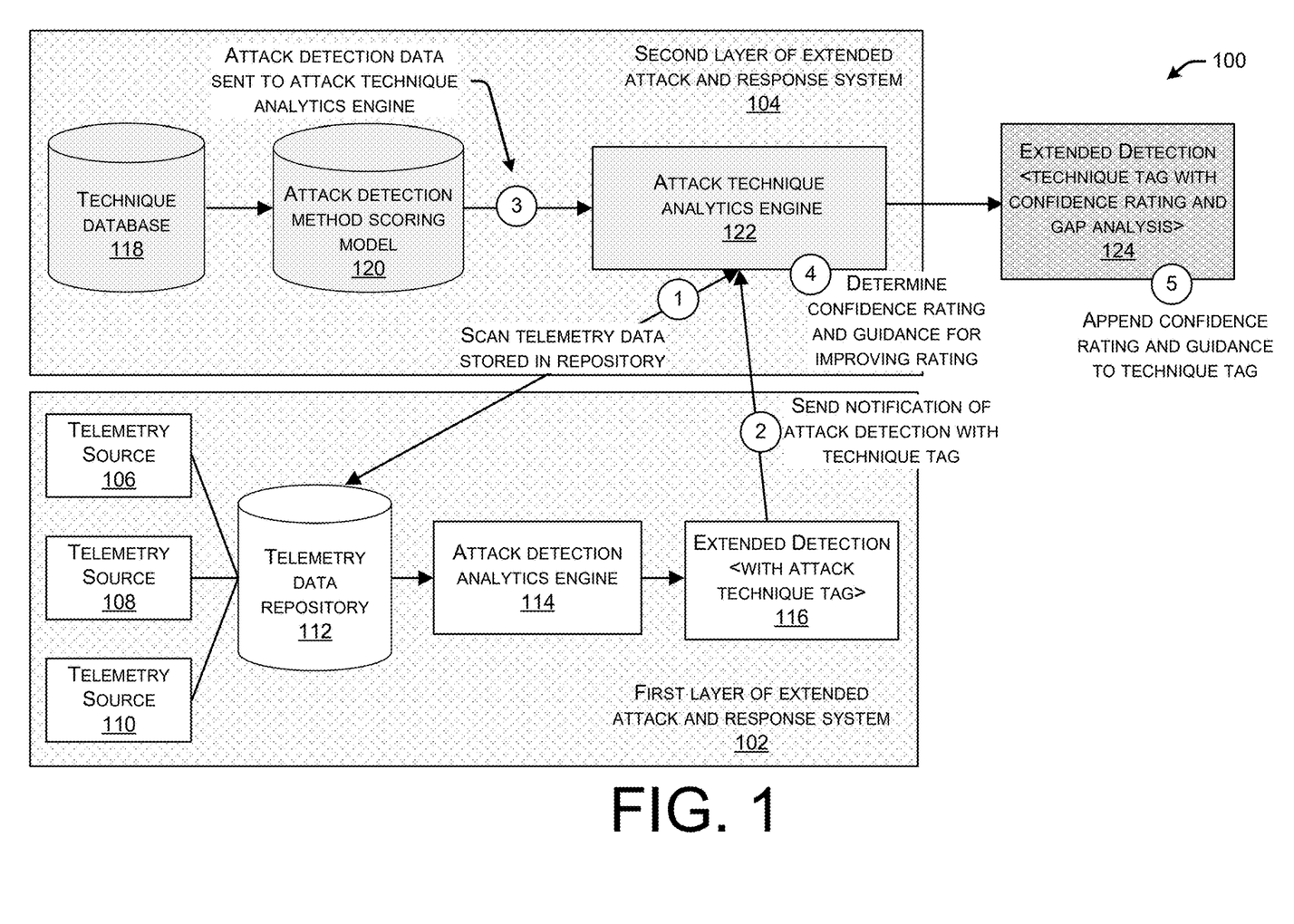
FIG. 1 illustrates an example environment that may implement various aspects of the technologies directed to increasing the efficacy and fidelity in the labeling of an attack technique for an Extended Detection and Response System

FIG. 1 illustrates an example environment 100 that may implement various aspects of the technologies directed to increasing the accuracy in the labeling of an attack technique for an extended detection and response system by providing a confidence rating for an attack technique tag and a guidance for improving the confidence rating. Environment 100 includes a first layer of an extended attack and response system 102. The first layer of the extended attack and response system 102 represents a conventional extended attack and response system that may be presently implemented today, where an attack technique tag is provided with no indication as to the accuracy of the resulting attack technique. Environment 100 also includes a second layer of the extended attack and response system 104. The second layer of the extended attack and response system 104 provides for the novel techniques for improving the accuracy of an extended attack and response system as described herein.

The first layer of the extended attack and response system 102 of environment 100 includes multiple telemetry sources, telemetry source 106, telemetry source 108, and telemetry source 110. The telemetry sources may provide raw log telemetry, such as flow records, system logs, etc. or detection telemetry such as from a firewall, endpoint detection logs, etc. Although three sources of telemetry are shown in environment 100, more or less telemetry sources may be available in an extended attack and response system. The first layer of the extended attack and response system 102 also includes a telemetry data repository 112 for collecting and storing the telemetry data from the multiple telemetry sources.

The first layer of the extended attack and response system 102 of environment 100 also includes an attack detection analytics engine 114. The attack detection analytics engine 114 analyzes telemetry collected and stored in the telemetry data repository 112 to detect an attack. The attack detection analytics engine 114 also determines an attach technique used in perpetrating the detected attack and outputs this information to a user or administrator as an extended detection 116 with an attack technique tag. The extended detection 116 with attack technique tag is the product of a typical extended attack and response system in use today and may be displayed to a user or administrator and indicates a resulting attack detection to the user with an attached technique tag. Typically, the attached technique tag corresponds to an attacker's tactic, technique, and procedure, or TTP, and will correspond to a cell in the MITRE ATT&CK matrix. However, as described above there is no way of knowing if this TTP is accurate or not, nor is there a way of knowing how to improve the likelihood that the TTP is in fact accurate.

The second layer of the extended attack and response system 104 of environment 100 includes a technique database 118. The technique database 118 contains known methods of attack detection. The technique database 118 serves as a representative set of descriptors of know attacker technique with mitigating controls or methods of detections. An example is the MITRE ATT&CK matrix, although the technique database 118 may be any collection of, or any combination of collections of, known methods of attacker techniques and their methods of detection.

The second layer of the extended attack and response system 104 of environment 100 includes an attack detection method scoring model 120. The attack detection method scoring model 120 serves as a foundation for the likelihood of a given detection technique to detect a given attack technique. The attack detection method scoring model 120 assigns percentages and probabilities to detection methods based on the provided data inputs and the attack technique. In other words, the detection method scoring model 120 provides attack technique data including a likelihood of a particular attack technique, from among multiple attack techniques, occurring determined using a particular attack detection source from among multiple attack detection sources.

The second layer of the extended attack and response system 104 also includes an attack technique analytics engine 122. The attack technique analytics engine 122 leverages multiple data streams, produced by the multiple telemetry sources and stored in the telemetry data repository 112, along with one or more extended detections 116 from the first layer of the extended attack and response system 102 and received from the attack detection analytics engine 114, and the output of the attack technique data from the attack detection method scoring model 120 to compute a confidence rating for the attack technique indicated by the extended detection 116. The confidence rating indicates a probability that the technique tag included with the extended detection 116 is accurately labeled based on the data sources and detection methods used in the determination of the extended detection 116. In some instances, if the confidence rating is too low, or below a predetermined threshold, the attack technique analytics engine 122 may discard the attack technique tag received with the extended detection 116 from the attack detection analytics engine 114 and generate a new attack technique tag to append to the extended detection. If the attack technique analytics engine 122 discards the original attack technique tag, the attack technique analytics engine 122 analyzes the data streams from the telemetry data repository 112, and the attack technique data from the attack detection method scoring model 120 to determine an attack technique that is more probable given the detection methodologies.

Regardless of whether the attack technique analytics engine 122 keeps the original attack technique tag as determined by the attack detection analytics engine 114, or generates a new attack technique tag with a more probable attack technique, the attack technique analytics engine 122 determines a confidence rating that the attack technique is the attack technique used in the detected attack. The confidence rating indicates the probability that the attack technique tag is accurately labeled based on the data sources and detection methods. In addition, the attack technique analytics engine 122 does a gap analysis on the data set to identify what additional data sources or detection methodologies would increase the confidence rating. In essence the gap analysis provides a guidance for improving the confidence rating. The technique tag (whether original and generated by the attack detection analytics engine, or newly generated by the attack technique analytics engine 122), the attack technique confidence rating, and the guidance for improving the confidence rating are appended to the attack detection and displayed as an extended detection 124 including technique tag with confidence rating and gap analysis as shown in environment 100.

In some instances, when the confidence rating is too low, or below a predetermined threshold, and the attack technique analytics engine 122 determines an attack technique that is more probable, the confidence rating of the newly determined technique may be within a threshold distance of the confidence rating of the original attack technique. In this example, the extended detection 124 may include both the original attack technique with confidence rating and the newly determined attack technique with confidence rating.

To implement techniques described herein for increasing the accuracy in the labeling of an attack technique tag for an extended detection and response system by providing a confidence rating for the attack technique and a guidance for improving the confidence rating, telemetry data, acquired from multiple telemetry sources (telemetry source 106, telemetry source 108, and telemetry source 110) is stored in the telemetry data repository 112. Note, that although environment 100 illustrates three telemetry sources, this is by example and not limitation, more or less telemetry sources may be available. At (1) the attack technique analytics engine 122 may scan the telemetry data stored in the telemetry data repository 112. Alternately, in some examples, the telemetry data may be sent from the telemetry data repository 112 to the attack technique analytics engine 122 for analysis. At (2) a notification of a detected attack is sent from the attack detection analytics engine 114 to the attack technique analytics engine 122. The notification is the extended detection 116 generated by a conventional extended attack and response system or the first layer of the extended attack and response system 102 of environment 100. The extended detection 116 includes an attack technique tag indicating an attack technique used in the detected attack as mapped by the attack detection analytics engine based on the telemetry from one or more of the telemetry sources. At (3) the attack technique analytics engine 122 takes as input attack detection data from the attack detection method scoring model 120. The attack detection data includes a likelihood of a particular attack technique, from among multiple attack techniques, occurring determined using a particular attack detection source from among multiple attack detection sources for multiple attack techniques. At (4) The attack technique analytics engine 122 determines a confidence rating that the detected attack corresponds to the attack technique included in the attack technique tag provided by the attack detection analytics engine 114. In addition, the attack technique analytics engine 122 performs a gap analysis on the data sets to identify what additional data sources or detection methodologies would increase the probability and provides this information as a guidance on how to improve the confidence rating. At (5) the attack technique analytics engine 122 outputs an extended detection 124 that includes the attack technique tag with the confidence rating and guidance on how to improve the confidence rating.

Figure 2:
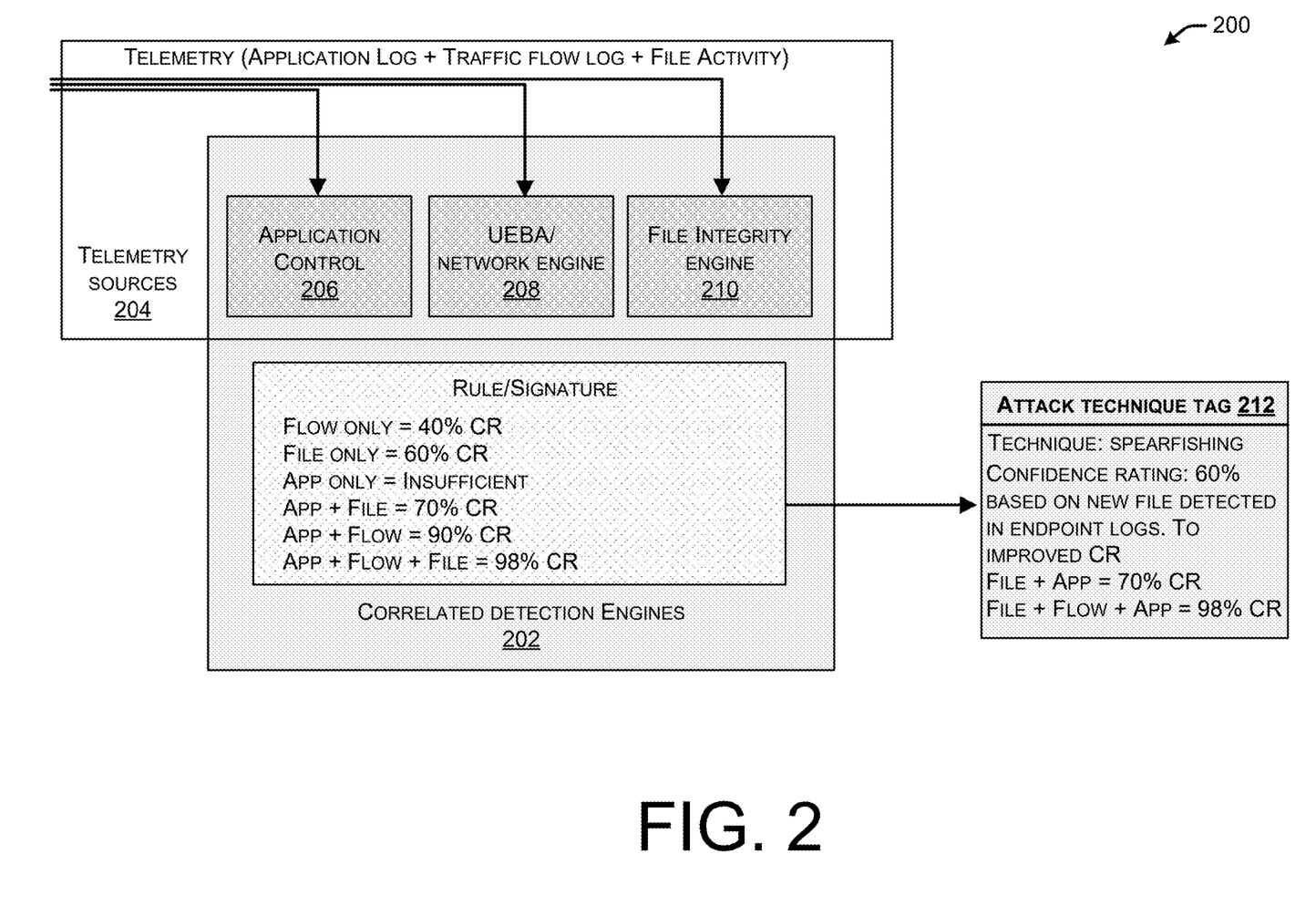
FIG. 2 illustrates an example of generating an attack technique tag with confidence ratings for various inputs and gap analysis.

FIG. 2 illustrates an example environment 200 that may implement various aspects of the technologies directed to providing a confidence rating for an attack technique tag and a guidance for improving the confidence rating. Environment 200 includes correlated detection engines 202. The correlated detection engines 202 included combined functionality from the attack detection analytics engine 114 of the first layer of the extended attack and response system 102 and the attack technique analytics engine 122 of the second layer of the extended attack and response system 104 as described with reference to FIG. 1. Environment 200 also includes multiple telemetry sources 204. As an example of telemetry that may be used to implement techniques as described herein, environment 200 includes numerous detection techniques including application control 206 that monitors application logs for suspicious files and content. Also included in the telemetry sources 204 of environment 200 is a User and Entity Behavior Analytics (UEBA)/network engine 208 that may use algorithms and machine learning to detect anomalies in the behavior of users and devices in a network, such as network flow logging analytics that detects suspicious communications and interactions. The network engine 208 may monitor network traffic for suspicious content as well as unusual traffic flows. The telemetry sources 204 of environment 200 also includes a file integrity engine 210 that may monitor endpoint logs for creation of new files.

The telemetry sources 204 (along with the attack detection data received by the attack technique analytics engine 122 from the attack detection method scoring model 120 as described with reference to FIG. 1) provide the correlated detection engines 202 with information necessary to generate an attack technique tag 212 that includes an attack technique being used in a detected attack, a confidence rating that the attack technique is correct, and a guidance for improving the confidence rating. The example attack technique illustrated in attack technique tag 212 is spearfishing. The attack was detected by the file integrity engine 210 and based on a new file being detected when monitoring an endpoint log. Based on this methodology used to detect the attack and the attack detection data, the correlated detection engines 202 determined that the confidence rating that spearfishing is in fact the type of attack being perpetrated is 60%. However, if telemetry data from application control 206 also indicates that spearfishing is the type of attack being perpetrated, the confidence rating will increase to 70%, and if telemetry data from application control 206, the network engine 208, and the file integrity engine 210 all indicated that spearfishing is the type of attack being perpetrated, the confidence rating that spearfishing is happening will increase to a confidence rating of 98%. Thus, if all three available detection methodologies indicate that spearfishing is an attack technique being used for a detected attack, there is a 98% chance that a spearfishing attack is occurring.

Figure 3:
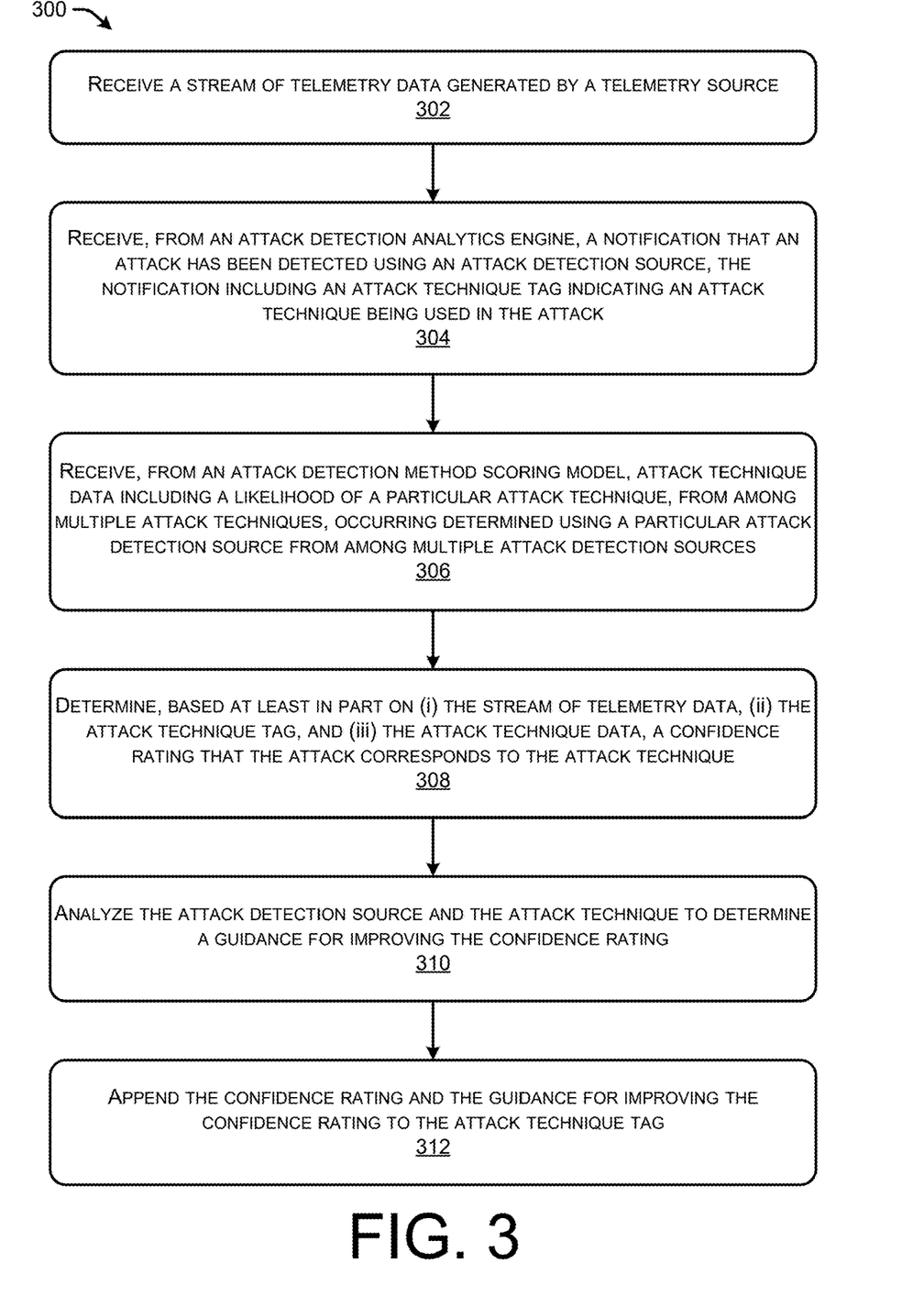
FIG. 3 is a flow diagram illustrating an example method associated with the techniques described herein for generating an extended detection attack technique tag with confidence rating and gap analysis.

FIG. 3 is a flow diagram illustrating an example method 300 associated with the techniques described herein for providing a confidence rating for an attack technique tag and a guidance for improving the confidence rating and appending them to an attack technique tag. Example method 300 illustrates aspects of the functions performed by the attack technique analytics engine 122 as described with reference to FIG. 1. The logical operations described herein with respect to FIG. 3 may be implemented (1) as a sequence of computer-implemented acts or program modules running on a computing system and/or (2) as interconnected machine logic circuits or circuit modules within the computing system. In some examples, the method(s) 300 may be performed by a system comprising one or more processors and one or more non-transitory computer-readable media storing computer-executable instructions that, when executed by the one or more processors, cause the one or more processors to perform the method(s) 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302 an attack technique analytics engine receives a stream of telemetry data generated by a telemetry source. For example, with reference to FIG. 1 the attack technique analytics engine 122 receives telemetry data generated by telemetry sources and stored in the telemetry data repository 112 at (1). The telemetry sources may be raw log telemetry such as flow records and system logs, or the telemetry may be detection telemetry from firewalls, endpoint detection logs, etc. In another example with reference to FIG. 2, the correlated detection engines 202 (which comprises an attack technique analytics engine and an attack detection analytics engine) receive streams of telemetry from application control 206, a UEBA/network engine 208, and a file integrity engine 210.

At operation 304 the attack technique analytics engine receives, from an attack detection analytics engine, a notification that an attack has been detected using an attack detection source, the notification including an attack technique tag indicating an attack technique being used in the attack. For example, with reference to FIG. 1 the attack technique analytics engine 122 receives one or more extended detections 116 with attack technique tags from the attack detection analytics engine 114. As illustrated in FIG. 1, the extended detections 116 received are the output of the first layer of the extended attack and response system 102, or a conventional extended attack and response system.

At operation 306 the attack technique analytics engine receives from an attack detection method scoring model, attack technique data including a likelihood of a particular attack technique, from among multiple attack techniques, occurring determined using a particular attack detection source from among multiple attack detection sources. For example, with reference to FIG. 1 the attack technique analytics engine 122 receives attack technique data from the attack detection method scoring model 120 as shown at (3). As many techniques span domains and datasets a single method of detection will not necessarily detect all occurrences of a specific attack technique. The attack detection method scoring model 120 assigns percentages and probabilities to a detection method given the data inputs and the attack technique described and outputs this data to the attack technique analytics engine 122.

At operation 308, the attack technique analytics engine determines, based at least in part on (i) the stream of telemetry data, (ii) the attack technique tag, and (iii) the attack technique data, a confidence rating that the attack corresponds to the attack technique. For Example, with reference to FIG. 1 the attack technique analytics engine 122 determines a confidence rating that the detected attack corresponds to the attack technique indicated in the attack technique tag in the extended detection 116. The determination is based on analysis of the inputs to the attack technique analytics engine 122 which are the telemetry data received from the telemetry data repository at (1), the attack technique tag received from the attack detection analytics engine 114 at (2) and the attack detection data received from the attack detection method scoring model 120 at (3).

At operation 310 the attack technique analytics engine analyzes the attack detection source and the attack technique to determine a guidance for improving the confidence rating. For example, with reference to FIG. 1 the attack technique analytics engine 122 performs a gap analysis on the data set to determine a guidance for improving the confidence rating. The gap analysis can identify additional data sources or detection methodologies that would increase the confidence rating. In another example, with reference to FIG. 2 the correlated detection engines 202 output the attack technique tag 212 that indicates that spearfishing is occurring based on a new filed detected in an endpoint log. The confidence rating that spearfishing is in fact occurring based on the detection method is 60%. However, the guidance included in attack technique tag 212 indicated that the confidence rating will increase to 70% if telemetry from application control 206 also indicated that spearfishing is occurring, and will increase to 98% if telemetry from application control 206, network engine 208, and file integrity engine 210 all indicate that spearfishing is occurring.

At operation 312 the attack technique analytics engine appends the confidence rating and the guidance for improving the confidence rating to the attack technique tag. For example, with reference to FIG. 1 the attack technique analytics engine appends the confidence rating and guidance for improving the confidence rating to the attack technique tag of the extended detection and output or displays the extended detection 124 for a user of administrator. In some examples, the technique tag may be the same technique tag the attack technique analytics engine 122 received from the attack detection analytics engine 114 at (2) in FIG. 1. However, in other examples the confidence rating may be below a predetermined threshold and the attack technique analytics engine 122 may determine a more probable attack technique based on the detection method and the attack technique data received from the attack detection method scoring model 120, and generate a new technique tag indicating the more probable attack technique. In such an example, the attack technique analytics engine 122 may determine a new confidence rating for the new more probable attack technique and a new guidance for how to further improve the confidence rating and append the new confidence rating and guidance to the newly generate technique tag.

Figure 4:
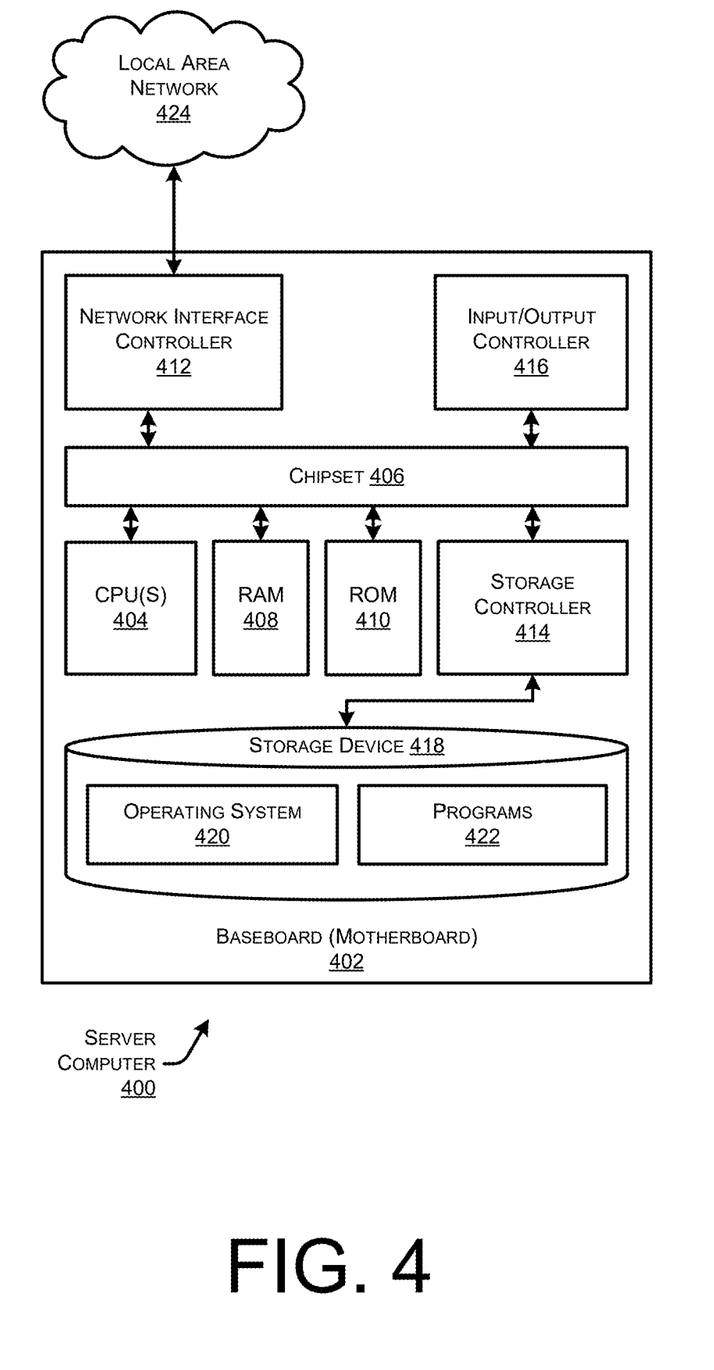
FIG. 4 is a computer architecture diagram showing an illustrative computer hardware architecture for implementing a server device that can be utilized to implement aspects of the various technologies presented herein.

FIG. 4 shows an example computer architecture for a computing device (or network routing device) 400 capable of executing program components for implementing the functionality described above. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 400 may, in some examples, correspond to the attack detection method scoring model 120, the attack technique analytics engine 122, or the attack detection analytics engine 114 described herein with respect to FIG. 1.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to start up the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the network 424. The chipset 406 can include functionality for providing network connectivity through a NIC 412, such as a gigabit Ethernet adapter. The NIC 412 is capable of connecting the computing device 400 to other computing devices over the network 424. It should be appreciated that multiple NICs 412 can be present in the computing device 400, connecting the computer to other types of networks and remote computer systems.

The computing device 400 can be connected to a storage device 418 that provides non-volatile storage for the computing device 400. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the attack detection method scoring model 120, the attack technique analytics engine 122, the attack detection analytics engine 114 and or any components included therein, may be supported by one or more devices similar to computing device 400. Stated otherwise, some or all of the operations performed by the attack detection method scoring model 120, the attack technique analytics engine 122, or the attack detection analytics engine 114 or any components included therein, may be performed by one or more computing device 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIG. 4. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by an attack technique analytics engine in an extended detection and response system, the method comprising:
   receiving a stream of telemetry data generated by a telemetry source;
   receiving, from an attack detection analytics engine, a notification that an attack technique has been detected using an attack detection source, the notification including an attack technique tag indicating an attack technique being used in the attack;
   receiving, from an attack detection method scoring model, attack technique data including a likelihood of a particular attack technique, from among multiple attack techniques, occurring determined using a particular attack detection source from among multiple attack detection sources;
   determining, based at least in part on (i) the stream of telemetry data, (ii) the attack technique tag, and (iii) the attack technique data, a confidence rating that the attack corresponds to the attack technique;
   analyzing the attack detection source and the attack technique to determine a guidance for improving the confidence rating; and
   appending the confidence rating and the guidance for improving the confidence rating to the attack technique tag.

2. The method of claim 1, wherein the attack technique is a first attack technique, the guidance is a first guidance, and the confidence rating is a first confidence rating and is below a predetermined threshold and further comprising:
   determining, based at least in part on the attack detection source and the attack technique data, that the attack being detected is more likely to correspond to a second attack technique;
   determining, based at least in part on (i) the stream of telemetry data, (ii) the second attack technique, and (iii) the attack technique data, a second confidence rating that the attack corresponds to the second attack technique;
   analyzing the attack detection source and the second attack technique to determine a second guidance for improving the second confidence rating; and
   generating a second attack technique tag that indicates the second attack technique, the second confidence rating, and the second guidance for improving the second confidence rating.

3. The method of claim 2, wherein the second attack technique tag includes the first attack technique with the first confidence rating and the second attack technique with the second confidence rating.

4. The method of claim 3, wherein the first confidence rating and the second confidence rating are within a threshold distance, and wherein the second guidance indicates an additional attack detection source for improving the first confidence rating or the second confidence rating.

5. The method of claim 1, wherein the stream of telemetry data is a first stream of telemetry data from a first telemetry source and the guidance for improving the confidence rating indicates that including a second stream of telemetry data from a second telemetry source would increase the confidence rating that the attack corresponds to the attack technique.

6. The method of claim 1, wherein the attack detection method scoring model is a machine learning model trained on datasets comprising an attack detection source used to accurately detect an attack technique and received from a technique database of know methods of attack detection.

7. The method of claim 6, wherein the technique database is an augmented MITRE ATT&CK Matrix.

8. A system comprising:
   one or more processors; and
   one or more computer-readable media storing computer-executable instructions that, when executed by the one or more processors, cause the one or more processors to perform operations comprising:
   receiving, by an attack technique analytics engine, a stream of telemetry data generated by a telemetry source;
   receiving, by the attack technique analytics engine and from an attack detection analytics engine, a notification that an attack has been detected using an attack detection source, the notification including an attack technique tag indicating an attack technique being used in the attack;
   receiving, by the attack technique analytics engine and from an attack detection method scoring model, attack technique data including a likelihood of a particular attack technique, from among multiple attack techniques, occurring determined using a particular attack detection source from among multiple attack detection sources;
   determining, by the attack technique analytics engine, based at least in part on (i) the stream of telemetry data, (ii) the attack technique tag, and (iii) the attack technique data, a confidence rating that the attack corresponds to the attack technique;
   analyzing, by the attack technique analytics engine, the attack detection source and the attack technique to determine a guidance for improving the confidence rating; and
   appending, by the attack technique analytics engine, the confidence rating and the guidance for improving the confidence rating to the attack technique tag.

9. The system of claim 8, wherein the attack technique is a first attack technique, the guidance is a first guidance, and the confidence rating is a first confidence rating and is below a predetermined threshold and the operations further comprising:
   determining, based at least in part on the attack detection source and the attack technique data, that the attack being detected is more likely to correspond to a second attack technique;
   determining, based at least in part on (i) the stream of telemetry data, (ii) the second attack technique, and (iii) the attack technique data, a second confidence rating that the attack corresponds to the second attack technique;
   analyzing the attack detection source and the second attack technique to determine a second guidance for improving the second confidence rating; and
   generating a second attack technique tag that indicates the second attack technique, the second confidence rating, and the second guidance for improving the second confidence rating.

10. The system of claim 9, wherein the second attack technique tag includes the first attack technique with the first confidence rating and the second attack technique with the second confidence rating.

11. The system of claim 10, wherein the first confidence rating and the second confidence rating are within a threshold distance, and wherein the second guidance indicates an additional attack detection source for improving the first confidence rating or the second confidence rating.

12. The system of claim 8, wherein the stream of telemetry data is a first stream of telemetry data from a first telemetry source and the guidance for improving the confidence rating indicates that including a second stream of telemetry data from a second telemetry source would increase the confidence rating that the attack corresponds to the attack technique.

13. The system of claim 8, wherein the attack detection method scoring model is a machine learning model trained on datasets comprising an attack detection source used to accurately detect an attack technique and received from a technique database of know methods of attack detection.

14. The system of claim 13, wherein the technique database is MITRE ATT&CK Matrix.

15. One or more non-transitory computer-readable media storing instructions that, when executed, cause one or more processors to perform operations comprising:
  receiving, by an attack technique analytics engine, a stream of telemetry data generated by a telemetry source;
  receiving, by the attack technique analytics engine and from an attack detection analytics engine, a notification that an attack has been detected using an attack detection source, the notification including an attack technique tag indicating an attack technique being used in the attack;
  receiving, by the attack technique analytics engine and from an attack detection method scoring model, attack technique data including a likelihood of a particular attack technique, from among multiple attack techniques, occurring determined using a particular attack detection source from among multiple attack detection sources;
  determining, by the attack technique analytics engine, based at least in part on (i) the stream of telemetry data, (ii) the attack technique tag, and (iii) the attack technique data, a confidence rating that the attack corresponds to the attack technique;
  analyzing, by the attack technique analytics engine, the attack detection source and the attack technique to determine a guidance for improving the confidence rating; and
  appending, by the attack technique analytics engine, the confidence rating and the guidance for improving the confidence rating to the attack technique tag.

16. The one or more non-transitory computer-readable media of claim 15, wherein the attack technique is a first attack technique, the guidance is a first guidance, and the confidence rating is a first confidence rating and is below a predetermined threshold and the operations further comprising:
  determining, based at least in part on the attack detection source and the attack technique data, that the attack being detected is more likely to correspond to a second attack technique;
  determining, based at least in part on (i) the stream of telemetry data, (ii) the second attack technique, and (iii) the attack technique data, a second confidence rating that the attack corresponds to the second attack technique;
  analyzing the attack detection source and the second attack technique to determine a second guidance for improving the second confidence rating; and
  generating a second attack technique tag that indicates the second attack technique, the second confidence rating, and the second guidance for improving the second confidence rating.

17. The one or more non-transitory computer-readable media of claim 16, wherein the second attack technique tag includes the first attack technique with the first confidence rating and the second attack technique with the second confidence rating.

18. The one or more non-transitory computer-readable media of claim 17, wherein the first confidence rating and the second confidence rating are within a threshold distance, and wherein the second guidance indicates an additional attack detection source for improving the first confidence rating or the second confidence rating.

19. The one or more non-transitory computer-readable media of claim 15, wherein the stream of telemetry data is a first stream of telemetry data from a first telemetry source and the guidance for improving the confidence rating indicates that including a second stream of telemetry data from a second telemetry source would increase the confidence rating that the attack corresponds to the attack technique.

20. The one or more non-transitory computer-readable media of claim 15, wherein the attack detection method scoring model is a machine learning model trained on datasets comprising an attack detection source used to accurately detect an attack technique and received from a technique database of know methods of attack detection.

* * * * *